United States Patent [19]

Schwarzbich

[11] Patent Number: 4,961,650
[45] Date of Patent: Oct. 9, 1990

[54] BALL CATCH FOR RELEASABLY RETAINING A GROOVED SHAFT

[76] Inventor: Jörg Schwarzbich, Meierfeld 14, D-4800 Bielefeld 1, Fed. Rep. of Germany

[21] Appl. No.: 344,375

[22] Filed: Apr. 28, 1989

[30] Foreign Application Priority Data

Apr. 28, 1988 [DE] Fed. Rep. of Germany ....... 3814374

[51] Int. Cl.$^5$ .............................................. F16C 32/00
[52] U.S. Cl. ........................................ 384/49; 74/475; 74/526; 403/328
[58] Field of Search ................. 384/49, 490, 491, 610; 403/328, 327, 108, 107; 74/526, 475

[56] References Cited

U.S. PATENT DOCUMENTS

| | | | |
|---|---|---|---|
| 4,521,650 | 6/1985 | Oswald | 74/475 X |
| 4,539,859 | 9/1985 | Arai et al. | 74/475 |
| 4,553,795 | 11/1985 | Takagi | 384/49 |
| 4,660,994 | 4/1987 | Masciarelli | 384/49 |
| 4,679,682 | 7/1987 | Gray, Jr. et al. | 74/475 X |
| 4,696,583 | 9/1987 | Gorges | 384/49 |

Primary Examiner—Thomas R. Hannon
Attorney, Agent, or Firm—Burns, Doane, Swecker & Mathis

[57] ABSTRACT

A ball catch for releasably retaining a grooved shaft comprises a hollow bushing, a guide part mounted in the bushing for axial movement, rolling elements disposed between opposing surfaces of the bushing and guide part to facilitate movement of the guide part, and a hemispherical socket seated on the front end of the guide part. A locking ball is disposed in the socket and is seated on a plurality of small bearing balls to facilitate rotation of the locking ball. A spring biases the guide part forwardly. The socket and guide part are formed of deep-drawn sheet parts and are fixedly joined together. The guide part is configured to impart radially outward elastic biasing forces to the rolling elements to eliminate any radial play of those elements between the bushing and guide part.

26 Claims, 4 Drawing Sheets

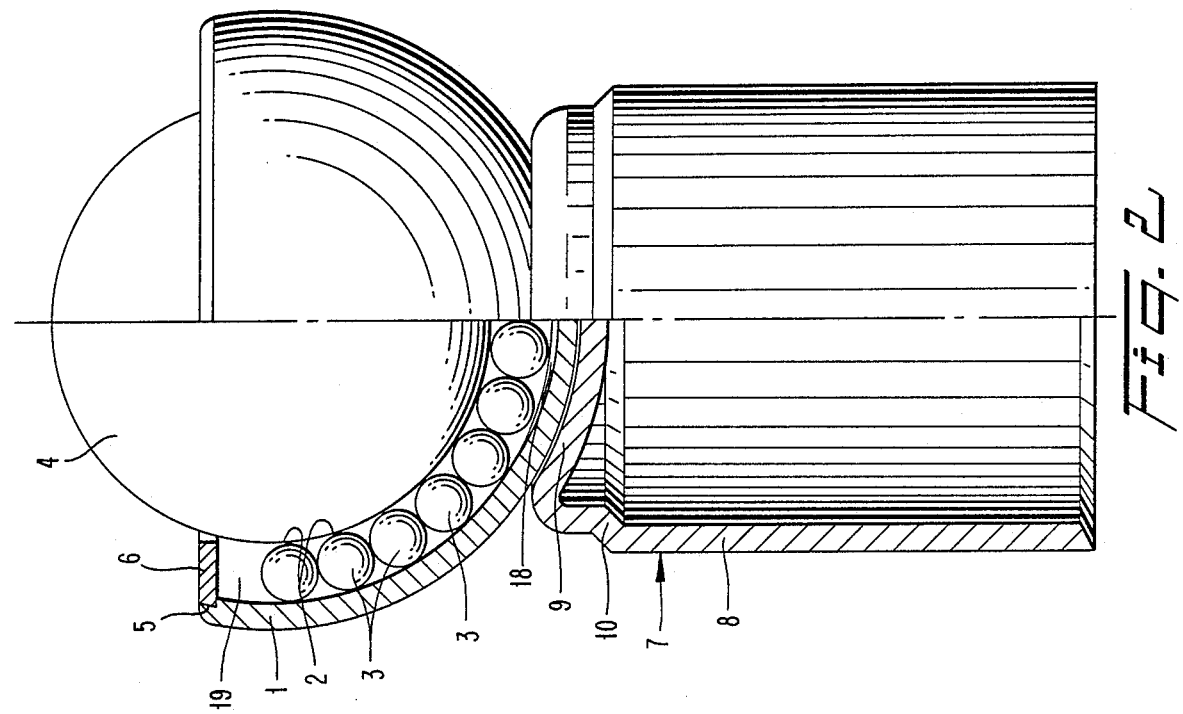
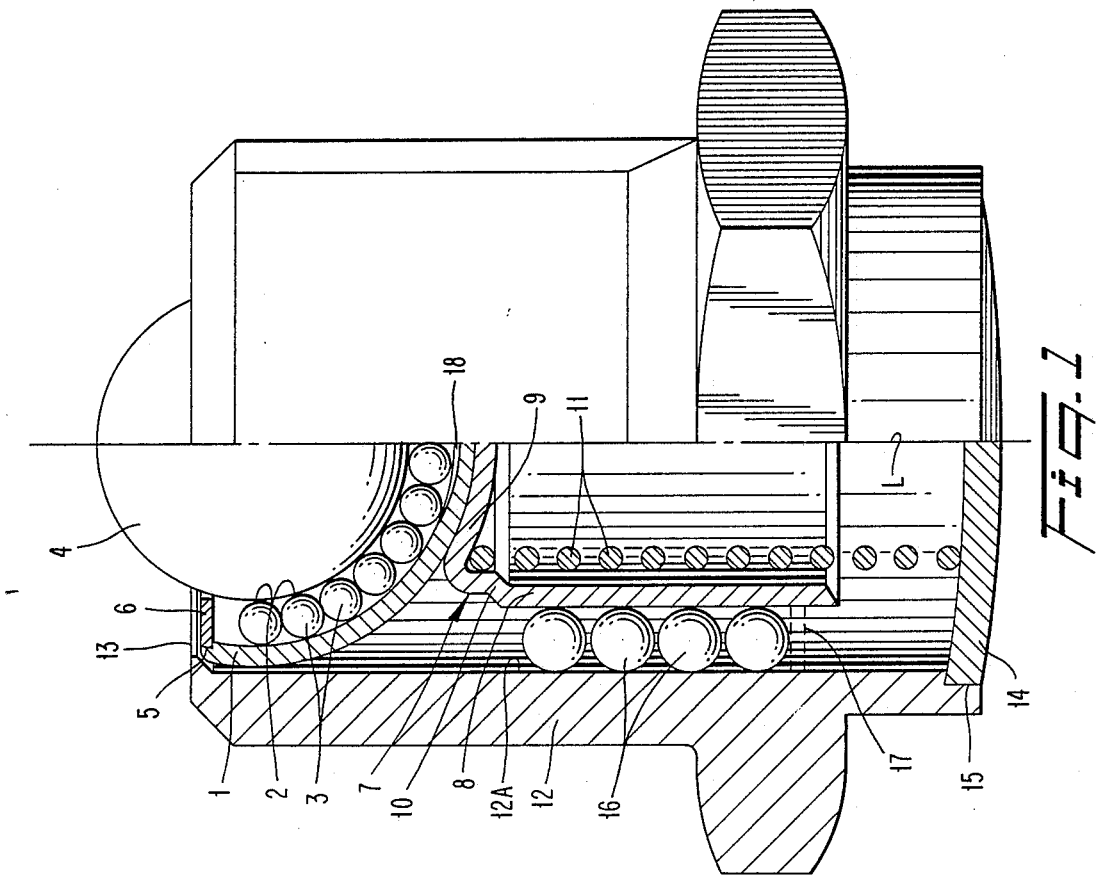

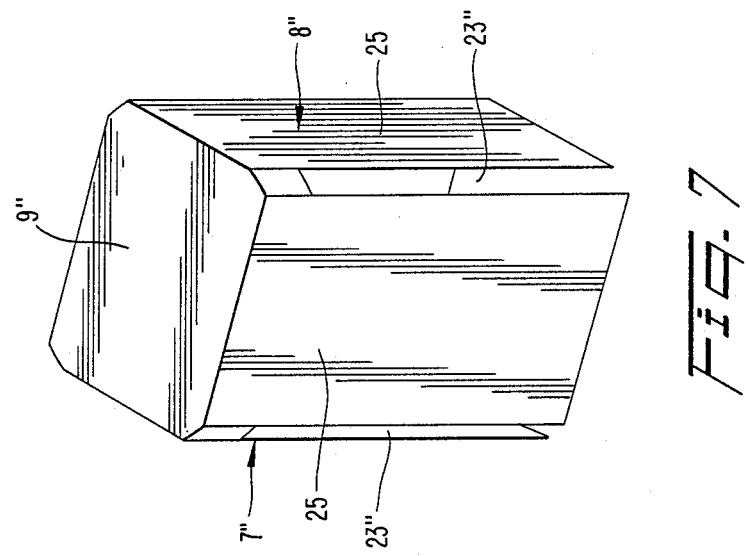
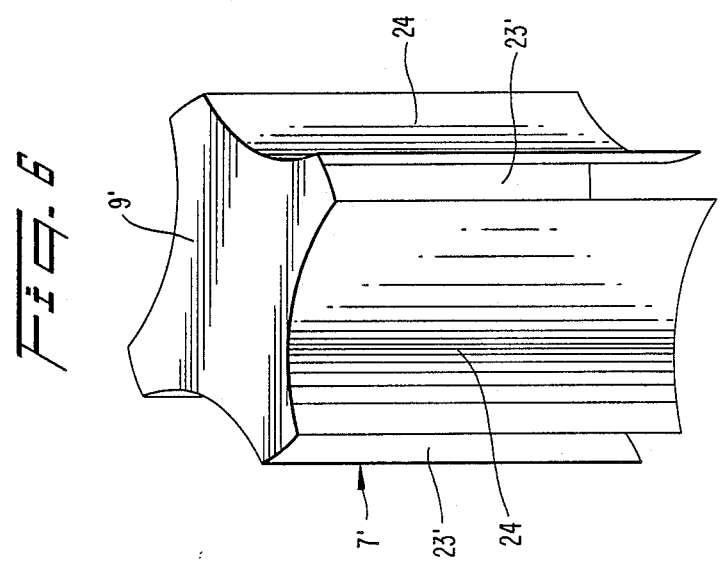
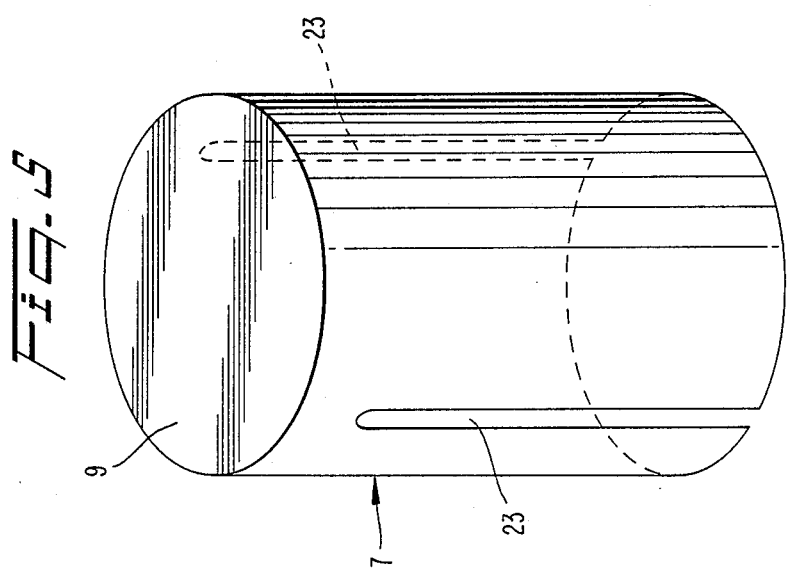

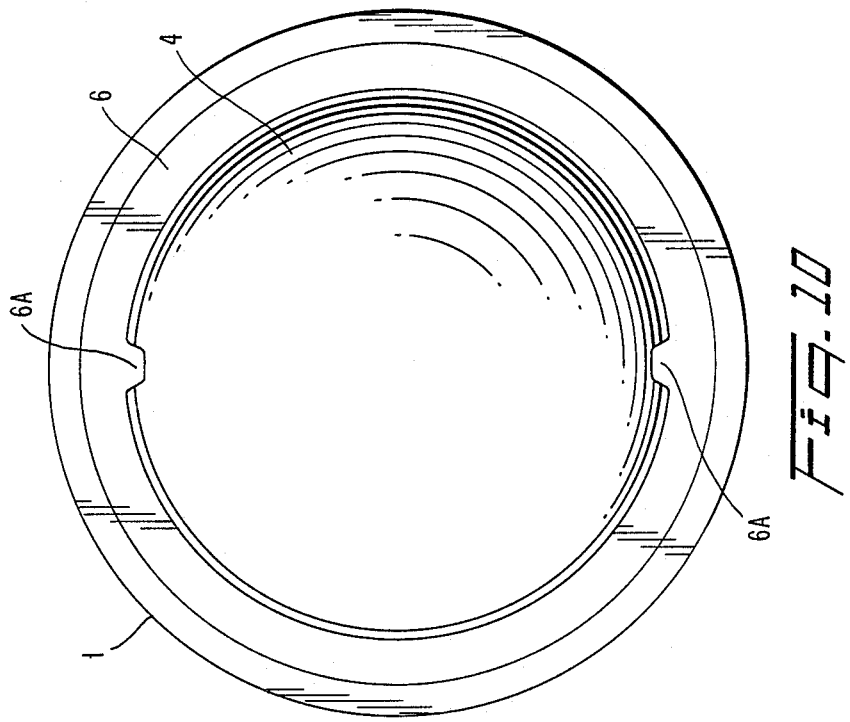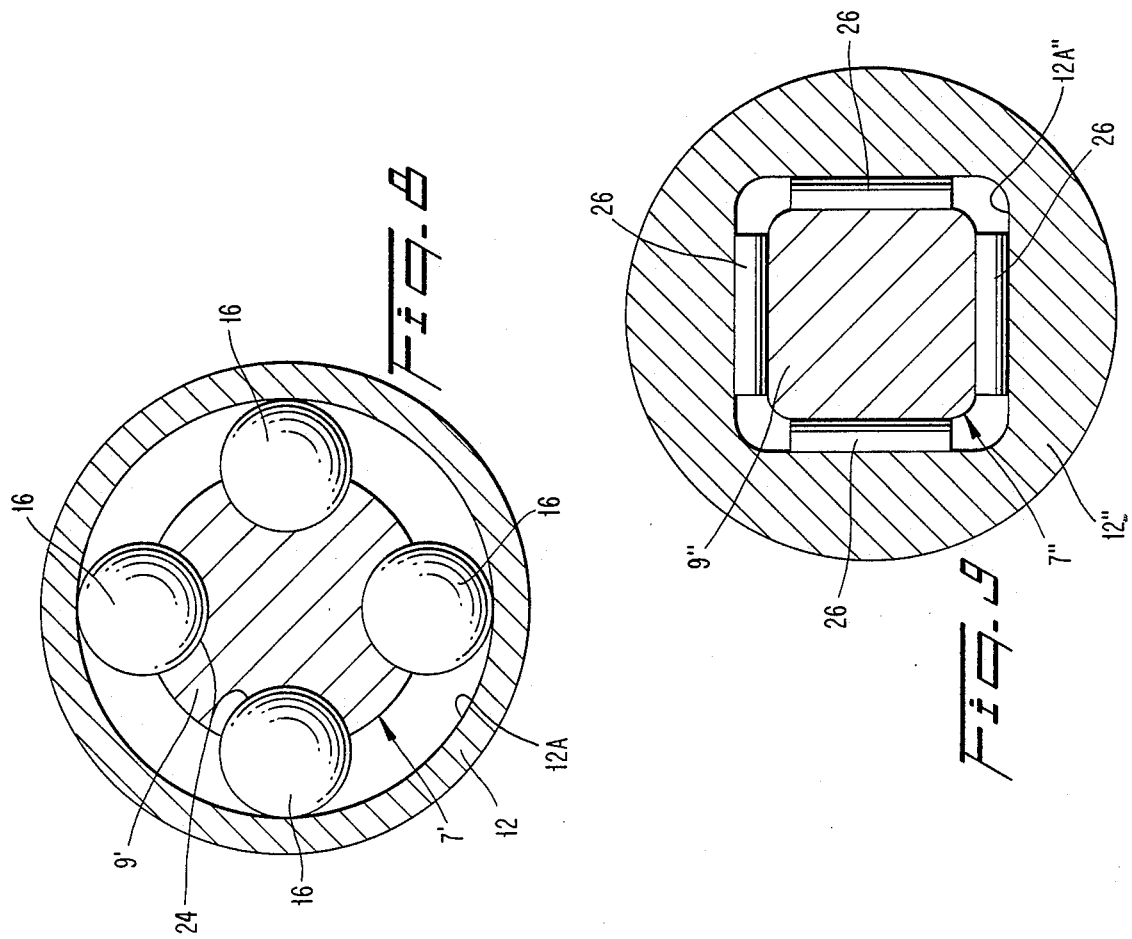

BALL CATCH FOR RELEASABLY RETAINING A GROOVED SHAFT

BACKGROUND OF THE INVENTION

The invention concerns a ball catch, in particular for the gear shift lever shaft of automotive vehicles, wherein a locking ball is abutting against the gear shift lever shaft under the effect of a compression spring and is guided on the gear shift lever shaft in parallel grooves. The locking ball is able to leave one groove and enter another while rolling over the intermediate combs of the shaft. The locking ball is bearingly supported in a hemispherical shell on small bearing balls, and the compression spring is acting on the hemispherical shell. A space is provided at the outer edge of the shell permitting free displacement of the small bearing balls. A recess is formed in the shell which also facilitates the free displacement of the small bearing balls. The hemispherical shell is seated on a guide part, which in turn comprises a seat and a guide for the compression spring. The guide part is axially moving in a bushing by means of rolling elements disposed therebetween.

Heretofore, the hemispherical shell and the guide part have been milled out of solid parts, which is a relatively expensive operation. Also, there has been a need to provide a certain clearance between an outer diameter of a cylindrical wall of the guide part and an inner diameter of the bushing bore in which the guide part moves in order to be able to insert the rolling elements therebetween. Due to normal manufacturing tolerances, it may occur that the clearance is too large, which can result in the guide part being able to wobble.

Furthermore, the locking ball is held in the hemispherical shell by means of a circlip which is inserted after the ball has been inserted. Since there remains very little space between the ball and the groove of the shell which receives the circlip, it can be very difficult to install the circlip.

It is an object of the invention to simplify and economize the production of such ball catches and also to improve their operation.

SUMMARY OF THE INVENTION

To attain this object, a ball catch of the above-mentioned generic type is characterized in that both the hemispherical shell and the guide part are in the form of parts made of deep-drawn sheet metal and are fixedly connected with each other.

As both of these parts, i.e., the hemispherical shell and the guide part, are in the form of parts with their largest cross section on their open side, the invention is based on the discovery that the two parts may be made individually as deep-drawn sheet metal parts. Heretofore, the parts have been milled of solid material and were correspondingly cost intensive, while high manufacturing tolerances were achieved at relatively high expense. Deep drawn parts, on the other hand can be produced at less cost and are well suited for use as tracks for bearing balls, assuming that suitable tolerances are achieved.

In order to facilitate the use of deep drawn parts, the need to form the guide part with a close tolerance is avoided by another aspect of the invention wherein a cylindrical wall of the guide part is made to be elastic and arranged such that the wall presses the roller elements elastically against the inner side of the bushing, so as to eliminate any clearances, regardless of whether the guide part was made with high or low dimensional tolerances. Preferably this is achieved by forming the cylindrical wall with slots and dimensioning the wall cross-section such that the wall presses outwardly against the roller elements.

This spring elastic configuration of the guide par is on the one hand readily produced, and on the other, it results in that the roller elements being supported between the outer surface of the guide part and the inner surface of the bushing without clearance. The guide part and thus the entire ball catch is thereby guided in an optimal manner. Heretofore, the roller elements have required a certain slight clearance, so that the individual parts may be assembled and the roller elements are able to roll in the intended fashion. Due to manufacturing conditions, this required clearance is provided with a certain tolerance, so that for example in the case of an unfavorable pairing of tolerances the clearance may end up to be relatively large, with this condition leading to "wobbling". In the case of a ball catch of this generic type, wobbling represents a substantial disadvantage, as it generates noise and potentially premature wear. Since, in accordance with the present invention, the rolling elements are pressed elastically between two surfaces, or tracks, it is unnecessary to observe specific manufacturing tolerances; proper guidance of the guide part without clearance, without wobbling, and without accompanying noise generation and the premature wear is assured.

The two deep-drawn parts, i.e., the hemispherical ball socket and the guiding part, may be fixedly joined by welding. Because of the pressure point of the spot weld connecting the ball socket and the guide part, it is desirable that the concave surface of the socket contain a spherical indentation therein which intersects the longitudinal axis of the ball catch. It is also desirable to provide the guide part in the shape of a cup with an end wall thereof curved so as to lay flush against the hemispherical socket.

According to another embodiment, the hemispherical ball socket and the guide part may be fixedly joined together by rivets or screws. The head of the rivet or screw may lie within the indentation of the socket surface.

Each of the two parts may be produced as deep-drawn parts in a single working step. It is readily apparent that this leads to considerable cost savings relative to a similar formed part milled on a lathe.

Aside from this, there are appreciable material savings, as practically all of the initial material is used for the deep-drawn parts and there is no waste. Furthermore, the parts may be hardened individually, but advantageously after their joining, among other reasons because the material thicknesses are highly uniform and a high quality hardened state may be obtained. No specific surface treatment, in particular of the surfaces serving as tracks for the roller elements, is necessary for deep-drawn parts, in contrast to the machined parts, as the parts pressed without the removal of material have blank and smooth surfaces.

It is desirable to guide the compression spring, which is located in the guide part, in a particularly secure manner. Hence, the front end of the guide part is provided with an inwardly projecting step or ridge as a guide for the compression spring. In particular, on the inside of the base of the guide part a cylindrical part may be provided as a guide for the compression spring.

Alternatively, the guide may comprise the head of the rivet or screw interconnecting the hemispherical ball socket and the guide part. At a slight distance from the base of the head-shaped guide part, in the wall of said part a recess may be provided as a counter support for the compression spring. The above-described simple measures significantly improve the mounting, support and guidance of the compression spring.

To ensure that the locking ball is being held and guided securely in the ball socket, it is advantageous according to a further development of the invention to arrange the upper closure of the bearing race in the form of a circlip as the holder. The circlip is set into an integral groove directly under the ridge of the hemispherical ball socket, but outside the center of the locking ball (spaced apart from the uppermost balls of the bearing race) with the inner free diameter of the ring being smaller than the largest diameter of the locking ball. According to one embodiment, at the upper rim of the hemispherical ball socket a holding ring for the locking ball may be held by an inwardly directed edge bead on the socket. The free inner diameter of the holding ring made of a nonhardening soft material is in one embodiment only slightly smaller than the diameter of the locking ball, in order to make possible a forced-in or snap-in insertion of the locking ball. The holding ring, the inner free diameter of which is at least equal to that of the locking ball, may be provided with at least three inwardly projecting noses, the frontal surfaces whereof are resting on a diameter smaller than that of the locking ball.

The holding ring may also be conical in shape, so that its free inner diameter corresponds to that of the locking ball and the ring is pressed into a planar shape following the insertion of the ball, whereby its inner diameter is reduced. If the holding ring is made of a hardenable material, it may be equipped with at least two opposing snap-in and holding noses for the locking ball. In the latter case, it is appropriate to make the hemispherical ball socket, the holding ring and the guide part of a hardenable material and to harden them together, i.e., after their assembly and mounting.

The holding ring at the upper edge of the hemispherical ball socket not only prevents the falling out of the small balls of the bearing race from the hemispherical socket, but the spacing apart of the holding ring from the uppermost rim of the bearing race provides adequate space for the rolling along the bearing race of the bearing balls upon a movement of the locking ball. The accompanying flow motions of the bearing race enable the small balls to escape and flow to locations wherein they again are in contact with the locking ball, whereby any backup of the small walls of the bearing is effectively prevented and any even partially frictional rolling of the locking ball o the bearing race is excluded. The different configurations described above of the holding ring provide a secure guidance of the locking ball in the hemispherical socket and prevent its dropping out, while the assembly, i.e., the insertion of the locking ball into the hemispherical socket is considerably simplified and made easier. The invention provides for the use both hardened parts and of a nonhardenable holding ring, so that the overall configuration may be adapted to the optimal prevailing conditions.

In the case of a ball catch of the afore-described generic type provided in the guide part with at least one axially parallel slot, production is very simple if the guide part consists of a deep-drawn material and if, for example, two axially parallel slots are located opposite each other. The guide part then may be deep-drawn from an approximately strip-shaped raw sheet metal part, whereby the "folding" of the strips into the cylindrical body of the guide part the slots are formed. In a similar manner, an approximately cross-shaped raw sheet metal part may be deep-drawn into a guide part having four axially parallel slots.

In the embodiment of the guide part with axially parallel slots, the main purpose of which is that the guide part is thereby rendered spring elastic and the roller elements may be located without clearance within the bushing, the tracks of the roller elements ar defined between the slots. Specifically in this slotted embodiment an advantageous further development is therefore possible, wherein the tracks no longer form a cylindrical circumferential surface, but are laid out in an advantageous further development in a manner such they are flat or concave. If the tracks are concave, a particularly advantageous guidance of the rolling elements is achieved. Also, the need for guiding the rolling elements in a special cage may be eliminated. If the tracks of the rolling elements on the guide part are coplanar, it is possible to equip the inner wall of the bushing also with opposing flat rolling tracks for the rolling elements, wherein the internal cross section of the bushing may be square or hexagonal. In this configuration, needle rollers may be used instead of balls as the rolling elements. Here again, it is not absolutely necessary to provide special guidance cages for the rolling elements.

Particularly in the above-described embodiments of the invention it is appropriate to equip the guide part at the free edge of the sleeve with radially outward directed angles, which limit the tracks of the rolling elements. The provision of such outwardly directed angles is possible without difficulty in the case of a guide part deep-drawn from sheet metal and it may be produced in a single step, while the loss of material due to chip formation is again eliminated.

BRIEF DESCRIPTION OF THE DRAWING

The objects and advantage of the invention will become apparent from the following detailed description of preferred embodiments thereof in connection with the accompanying drawings, in which like numerals designate like elements, and in which:

FIG. 1 is a partial longitudinal sectional view through an assembled ball catch according to the invention;

FIG. 2 is a view similar to FIG. 1 without the bushing and associated roller elements;

FIG. 5 is a perspective schematic view of an alternative guide part according to the invention;

FIG. 6 is a perspective schematic view of another alternative form of the guide part according to the invention;

FIG. 7 is a perspective schematic view of yet another alternative form of the guide part according to the invention;

FIG. 8 is a cross-sectional view through a ball catch using a guide part according to FIG. 6;

FIG. 9 is a cross-sectional view through a ball catch using the guide part of FIG. 7; and FIG. 10 is a front view of a socket and locking ball in which a modified circlip is mounted in the stock.

DETAILED DESCRIPTION OF PREFERRED EMBODIMENTS OF THE INVENTION

Figure 4:
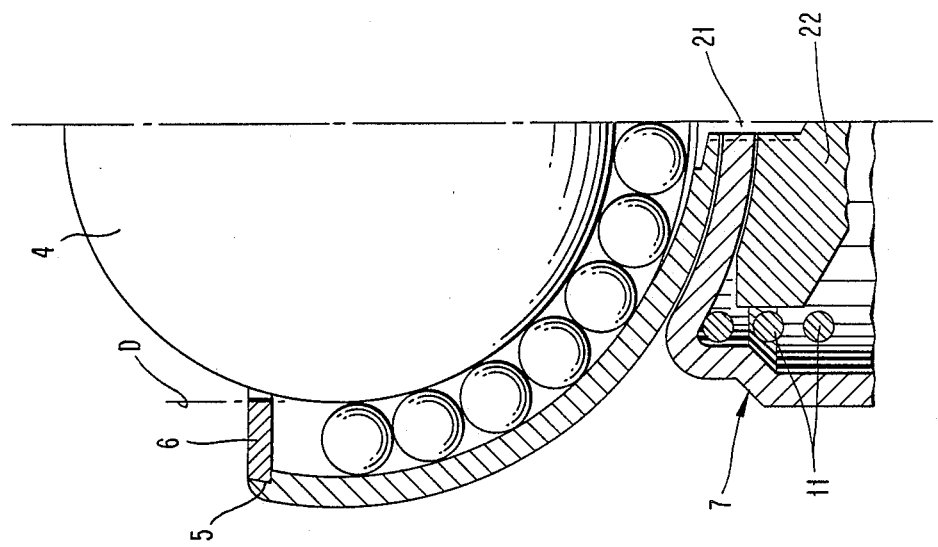
FIG. 4 is a view similar to FIG. 3 after the circlip has been deformed into a final position.

According to FIG. 1, a ball catch according to the invention comprises a hemispherical ball socket 1 formed of deep-drawn sheet metal. The socket 1 includes a forwardly facing concave surface in which a bearing bed is formed by small bearing balls 3. A locking ball 4 is supported in this bearing bed and is held by a retaining ring in the form of a circlip 6 set into an inner groove at the outer rim of the hemispherical ball socket. This circlip 6 has, in the inserted state, a smaller internal diameter than the diameter of the locking ball 4.

The hemispherical ball socket 1 is fixedly joined to a guide part 7 preferably by spot-welding in its center. The guide part 7 is of inverted cup-shape, and includes a sidewall in the form of a circular cylindrical side wall 8 closed at a front end by a curved base 9. The radius of curvature of the base 9 is adapted to the hemispherical ball socket 1, so that these two parts are resting flush against each other, thereby forming a good support and joint. The cylindrical wall 8 joins the base 9 by means of a radial inwardly stepped portion 10. A coil compression spring 11 disposed within the guide part 7 engages and is guided by the stepped portion 10 and is thereby spaced inwardly from the rest of the inner surface of the wall 8.

The guide part is disposed in a cylindrical bushing 12 having a bore 12A of circular cross-section. At its front end, the bushing 12 is provided with an inwardly directed collar 13, against the inside of which the edges of the hemispherical ball socket 1 or circlip 6 are abutting under the pressure of the spring 11.

The front end of the compression spring 11 abuts the base 9 and is supported at its rear end against a floor in the form of a spring washer 14, set into a groove 15 at the rear end of the bushing 12. Between the outer surface of the cylindrical wall 8 and the inner surface of the bushing 12, rolling elements 16 are movable in a cage 17, so that the guide part and thus the hemispherical ball socket may be pushed rearwardly within the bushing 12 in an easily moving manner against the pressure of the spring 11. Even a force acting very strongly laterally on the locking ball 4 cannot obstruct the displacement of the locking ball and its holding assembly, due to the presence of the rolling elements 16 between the guide par 7 and the bushing 12.

In a known manner, a spherical indentation 18 is formed in the center of the hemispherical socket and a space 19 free of the balls 3 is provided at the upper edge of the hemispherical socket. The indentation 18 is intersected by the longitudinal axis L of the ball catch and is of smaller radius than the concave surface of the socket. The balls 3 occupy less than the entire area of the concave surface to define the upper space 19. Due to the provision of the indentation 18 and the free unoccupied upper space 19, the small balls 3 of the bearing bed 2 are able to be displaced and flow freely in all directions, so that the locking ball may rotate in any manner, without regard to its location, as the result of being supported by a sliding friction, instead of a rolling friction or rotating friction as would occur if the small balls 3 could not be displaced.

Figure 3:
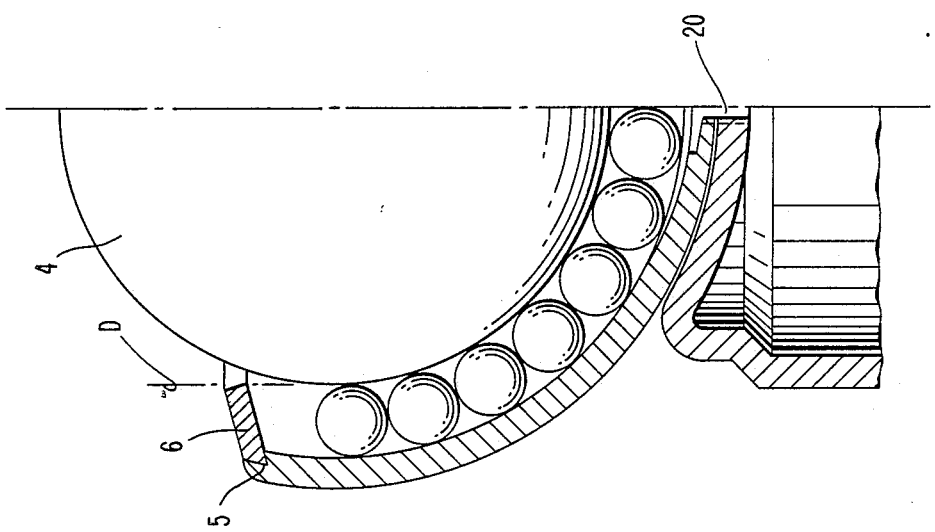
FIG. 3 is a longitudinal section through the upper segment of an internal art of a ball catch depicting an alternative circlip according to the invention.

The circlip 6, which holds the locking ball 4 in the hemispherical socket and prevents the escape of the bearing bed 2, is oriented perpendicular to the longitudinal axis of the guide part 7, with its free inner diameter being smaller than the largest diameter of the locking ball 4. The insertion of the circlip 6 is not simple, as there is not much space available for its insertion. According to the invention, therefore, an alternative assembly technique is proposed, as shown in FIGS. 3 and 4. It is seen in FIG. 3 that the circlip 6 is slightly conical, so that it tapers forwardly toward the longitudinal axis L. The largest diameter of the locking ball 4 is indicated by a broken line D, and the smallest inner diameter of the circlip 6 is defined by its rear edge in the inserted state according to FIG. 3. The latter diameter is smaller than the largest diameter of the locking ball. The largest diameter of the circlip 6 occurs when the circlip is in its conical state (FIG. 3), and that diameter is equal to or larger than the largest diameter of the locking ball. Thus, the locking ball may be inserted following the insertion of the conical circlip 6 into the groove 5, and after the hemispherical ball socket 1 has been filled with the small bearing balls 3. Following the insertion of the locking ball 4, the conical circlip 6 is deformed by being pressed into a planar position according to FIG. 4, so that its free internal diameter is smaller than the largest diameter of the locking ball 4, thereby holding the locking ball in its bearing bed. To assure that the circlip is sufficiently deformable, it is made of a thin and/or sufficiently soft material.

In the embodiment of the circlip 6 described in accordance with FIGS. 1 and 2, the circlip may be designed so that while in the inserted state its free inner diameter is only slightly smaller than the diameter of the locking ball, so that the locking ball may be forcefully "snapped in". To promote that action, it may be helpful to slightly bevel the inner side of the circlip 6, so that the rear edge thereof has a slightly smaller diameter than its front edge. Since both on the guide part 7 and the socket 1 form tracks for rolling elements, i.e., the balls 16 and the small bearing balls 3, it is necessary to harden these parts after the deep-drawing formation step. This hardening process may be carried out conventionally after the two parts are joined together, e.g., joined by spot welding. In this manner, an appreciable improvement of the economy of the manufacturing process is obtained. It is even possible to harden the circlip in the inserted position if it has the configuration described above.

Instead of inserting a circlip 6 into an internal groove 5 located at the inner edge of the hemispherical ball socket 1, the front edge of the hemispherical socket may comprise inwardly bent projections which hold the circlip 6 in position. These projections may be such that they make possible the snapping-in of the locking ball 4 and hold it securely afterwards. It is further possible according to the invention to provide internally directed projections on the bushing 12 in place of the collar 13, which are depressed following the insertion of the hemispherical socket. Alteratively, the projections 6A can be formed on the inner diameter of the circlip 6 as depicted in FIG. 10.

The connection between the hemispherical socket 1 and the guide part 7 may be established, as mentioned above, by spot welding. It is also possible to produce the indentation 18 by means of the spot welding electrode. According to another embodiment, the hemispherical socket and the guide part are fixedly joined together by a pin such as a central rivet 20 (FIG. 3). With this type of joining it is again possible to form the indentation 18 simultaneously with making the connection. In keeping with another embodiment, the hemispherical socket and the guide part are connected by means of a pin in the form of a screw 21, wherein in the example shown in FIG. 4 the head of screw 21 is inserted from the open side of the hemispherical socket and the shaft of the screw 21 penetrates the hemispherical socket and the center of the guide part and is screwed into a nut or counter piece 22, abutting the rear face of the base 9. This counter piece 22 contains a concave surface conforming to the convex shape of the rear surface of the base 9. An outer circumference of the counter piece 22 faces the compression spring 11 and aids in guiding or supporting the front turns of the spring.

It is also apparent that the rivet 20 can be directed oppositely from that shown in FIG. 3, i.e., such that it projects forwardly into the open space of the socket 1 and is there deformed into a rivet head.

The rolling elements or balls 16 which bearingly support the guide part 7 inside the bushing 12, are held in the cage 17, which prevents the displacement of individual balls or rows of balls relative to each other. This arrangement is highly essential because in the absence thereof, the exposure of the locking ball to a very obliquely outward directed force could cause the guide part to be tilted whereupon in certain peripheral areas of the guide part the balls 16 would not be held in view of the necessary bearing clearance and would be displaced relative to the adjacent balls, which are jammed in. During the subsequent axial motion, i.e., the depression or outward displacement of the locking ball under the effect of the compression spring 11, these displaced balls 16 would interfere with the movement of the locking ball.

Due to unfavorable dimensional tolerances, in particular when exclusively very high negative tolerances are meeting, or under other unfavorable conditions, it may occur that the entire ball cage becomes displaced freely together with the balls 16 relative to the guide part and the bushing. Here again, the motion of the guide part and thus of the locking ball could be considerably obstructed at least during the movement following the displacement of the cage. The result is a strong interference with the switching process or even an inaccurate locking of the locking ball into the next groove. This problem is alleviated according to the invention wherein the rolling elements are biased radially between the bushing and the guide part by making one of those members of elastic configuration. Preferably, it is the guide part 7 which elastically biases the balls 16 radially outward. For this purpose, one or several axially extending parallel slots 23 are provided in the cylindrical wall 9 (FIG. 5), and the configuration of the guide part is such that the difference between the diameter of the bore 12A of the bushing 12 and the outer diameter of the cylindrical wall 8 is less than the diameter of the balls 16. As a result, the cylindrical wall 8 is bent inwardly against an inherent outward bias so as to elastically bear against the bearing elements of balls 16 after its insertion, and press them against the wall of the bore 12A. There is then no clearance between the balls 16 on the one hand and the tracks defined by the guide part and the bushing on the other hand. The roller elements are, in effect, elastically clamped between the guide part and the bushing. Under these conditions, no displacement of individual balls or rows of balls relative to adjacent balls is possible in any case. This particular configuration may even make it possible to eliminate the ball cage.

The guide part 7' (FIG. 6) could be designed so that the tracks for the balls 16 are in the form of concave wall parts 24 disposed between the slots 23'. These wall parts 24 are spring elastic in the outward direction and therefore are resting tightly against the balls, so that the balls 16 are not only always guided frictionally and thereby are prevented from being displaced in the axial direction, but due to the concave configuration of the wall parts 24, any rotating motion of the guide part 7 is also effectively prevented. A cross-section through such an embodiment is shown in FIG. 8.

According to a further embodiment depicted in FIG. 7, the wall 8" of the guide part 7", has a polygonal, e.g., square, cross-section whereby the slots 23" define planar walls. Due to the presence of the slots 23 between the individual wall parts 25, the latter bear elastically and thus frictionally against the roller elements. In this embodiment the roller elements may be in the form of needles 26, with the corresponding tracks 12A" in the bushing 12 configured in correspondingly square cross-section and located opposite the wall parts 25 of the guide part 7 (FIG. 9).

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A ball catch for releasably retaining a grooved shaft, comprising:
   a hollow bushing having an internal surface defining a front-to-rear extending longitudinal axis,
   a guide part mounted in said bushing for axial movement, said guide part including a hollow skirt having an outer surface opposing said internal surface,
   rolling elements disposed between said outer and internal surfaces to facilitate movement of said guide part,
   a hemispherical socket seated on a front end of said guide part with its concave surface facing forwardly,
   a locking ball disposed in said socket,
   a plurality of small bearing balls disposed between said locking ball and said concave surface to facilitate rotation of said locking ball, said bearing balls occupying less than the entire concave surface, and said concave surface including an indentation intersected by said axis, to facilitate displacement of said bearing balls along said concave surface, and
   a compression spring disposed in said guide part for biasing said guide part forwardly,
   said socket and said guide part comprising deep drawn sheet parts and being fixedly joined together.

2. Ball catch according to claim 1, wherein said socket and guide part are welded together.

3. Ball catch according to claim 2, wherein said socket and guide part are welded at said indentation, said indentation being spherical and of smaller radius than said concave surface.

4. Ball catch according to claim 1, wherein said socket and said guide part are joined by a pin.

5. Ball catch according to claim 4, wherein said pin includes a head disposed in said indentation.

6. Ball catch according to claim 1, wherein said guide part is cup-shaped and includes a base closing said front end of said skirt, said socket including a convex surface, and said base including a concave surface receiving and conforming to said convex surface.

7. Ball catch according to claim 6, wherein said spring comprises a coil compression spring, said skirt including an internal surface, and support means defining a guide surface disposed adjacent a front end of said internal surface for radially supporting a front end of said spring.

8. Ball catch according to claim 7, wherein said support means comprises a cylindrical member attached to a rearwardly facing side of said base, a front end of said spring fitting around the outside of said cylindrical member.

9. Ball catch according to claim 8, wherein said cylindrical member comprises a portion of a pin fixedly joining said socket to said guide part.

10. Ball catch according to claim 7, wherein said support means comprises a radially inwardly projecting step of said skirt.

11. Ball catch according to claim 1, wherein a front end of said socket includes a radially inwardly opening groove, a retaining ring mounted in said groove and including an inner diameter smaller than a largest diameter of said locking ball for retaining said locking ball in said socket.

12. Ball catch according to claim 11, wherein said inner diameter is only slightly smaller than said largest diameter of said locking ball to enable said ball to be snapped into said socket.

13. Ball catch according to claim 11, wherein said retaining ring is deformable so as to be deformable from a conical shape to a planar shape after said ball is installed.

14. Ball catch according to claim 11, wherein said retaining ring includes a plurality of radially inward projections defining said inner diameter, said projections being elastically deformable to enable said locking ball to be snapped into s id socket.

15. Ball catch according to claim 11, wherein said socket, said retaining ring and said guide part are made of a hardenable material.

16. Ball catch according to claim 1, wherein a retaining ring is disposed at a front end of said socket for retaining said locking ball, said front end of said socket includes a radially inwardly projecting edge head for securing said retaining ring in position.

17. Ball catch according to claim 1, wherein said rolling elements are elastically biased between said internal and outer surfaces.

18. Ball catch according to claim 17, wherein said guide part is configured to impart radially outward elastic biasing forces to said rolling elements.

19. Ball catch according to claim 18, wherein said skirt includes at least one axial slot and is sized to press said rolling elements against said internal surface.

20. Ball catch according to claim 19, wherein said skirt is divided into at least three sections by a plurality of said slots, said sections defining segments of said outer surface which are of concave shape defining tracks for said rolling elements.

21. Ball catch according to claim 19, wherein said skirt is polygonal in cross-section and includes at least three sections by a plurality of said slots, said sections defining segments of said outer surface which are of planar shape defining tracks for said rolling elements, said internal surface of said bushing including planar facing said outer surface segments.

22. Ball catch according to claim 1, wherein said guide part includes means defining a cage for said rolling elements.

23. A ball catch for releasably retaining a grooved shaft, comprising:
a hollow bushing having an internal surface defining a front-to-rear extending longitudinal axis,
a guide part mounted in said bushing for axial movement, said guide part including a hollow skirt having an outer surface opposing said internal surface,
rolling elements disposed between said outer and internal surfaces to facilitate movement of said guide part,
a hemispherical socket seated on a front end of said guide part with its concave surface facing forwardly,
a locking ball disposed in said socket,
a plurality of small bearing balls disposed between said locking ball and said concave surface to facilitate rotation of said locking ball, said bearing balls occupying less than the entire concave surface, and said concave surface including an indentation intersected by said axis, to facilitate displacement of said bearing balls along said concave surface, and
a compression spring disposed in said guide part for biasing said guide part forwardly,
one of said outer and internal surfaces arranged to elastically bias said rolling elements against the other of said outer and internal surfaces.

24. Ball catch according to claim 23, wherein said skirt includes at least one axial slot and is sized to press said rolling elements against said internal surface.

25. Ball catch according to claim 24, wherein said skirt is divided into at least three sections by a plurality of said slots, said sections defining segments of said outer surface which are of concave shape defining tracks for said rolling elements.

26. Ball catch according to claim 24, wherein said skirt is polygonal in cross-section and includes at least three sections by a plurality of said slots, said sections defining segments of said outer surface which are of planar shape defining tracks for said rolling elements, said internal surface of said bushing including planar facing said outer surface segments.

* * * * *